United States Patent
Gabriele et al.

(10) Patent No.: US 11,429,182 B2
(45) Date of Patent: Aug. 30, 2022

(54) AUGMENTED REALITY VIRTUAL NUMBER GENERATION

(71) Applicant: Capital One Services, LLC, McLean, VA (US)

(72) Inventors: David Gabriele, Chicago, IL (US); Abdelkader M'Hamed Benkreira, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 4 days.

(21) Appl. No.: 16/876,721

(22) Filed: May 18, 2020

(65) Prior Publication Data

US 2021/0357018 A1    Nov. 18, 2021

(51) Int. Cl.
| | |
|---|---|
| *G06F 3/01* | (2006.01) |
| *G06F 3/16* | (2006.01) |
| *G06Q 20/32* | (2012.01) |
| *G06Q 20/40* | (2012.01) |
| *G06Q 20/34* | (2012.01) |
| *G02B 27/00* | (2006.01) |
| *G02B 27/01* | (2006.01) |

(52) U.S. Cl.
CPC .......... *G06F 3/011* (2013.01); *G02B 27/0093* (2013.01); *G02B 27/0172* (2013.01); *G06F 3/017* (2013.01); *G06F 3/167* (2013.01); *G06Q 20/321* (2020.05); *G06Q 20/322* (2013.01); *G06Q 20/351* (2013.01); *G06Q 20/4012* (2013.01); *G02B 2027/0178* (2013.01)

(58) Field of Classification Search
CPC .......... G06F 3/011; G06F 3/017; G06F 3/167; G06Q 20/321; G06Q 20/322; G06Q 20/351; G06Q 20/4012; G02B 27/0093; G02B 27/0172; G02B 2027/0178
See application file for complete search history.

(56) References Cited

U.S. PATENT DOCUMENTS

| | | | |
|---|---|---|---|
| 2008/0133392 A1 | 6/2008 | Jung et al. | |
| 2012/0290449 A1* | 11/2012 | Mullen | G06Q 20/3278 705/27.2 |
| 2012/0323787 A1* | 12/2012 | Nelsen | G06Q 20/351 705/44 |
| 2013/0254854 A1* | 9/2013 | Moganti | H04L 63/20 726/5 |
| 2013/0320080 A1* | 12/2013 | Olson | G07F 7/0833 235/380 |

(Continued)

*Primary Examiner* — Ryan R Yang
(74) *Attorney, Agent, or Firm* — Sterne, Kessler, Goldstein & Fox P.L.L.C.

(57) ABSTRACT

Disclosed herein are system, method, and computer program product embodiments for generating and displaying virtual number information using augmented reality technology. Interaction with virtual number information may be provided via an augmented reality display in relation to a payment object that is detected within a real-time view of an augmented reality application. Exemplary operations of the augmented reality application include providing a real-time view via the mobile device, processing a payment object shown via the real-time view, generating a virtual number based on processing of the payment object, and utilizing the generated virtual number.

18 Claims, 8 Drawing Sheets

(56) References Cited

U.S. PATENT DOCUMENTS

| | | |
|---|---|---|
| 2014/0019352 A1 | 1/2014 | Shrivastava |
| 2016/0109954 A1* | 4/2016 | Harris ................ G06K 9/00671 345/156 |
| 2016/0253710 A1 | 9/2016 | Publicover et al. |
| 2018/0150810 A1* | 5/2018 | Lee ...................... G06Q 20/102 |
| 2018/0150831 A1 | 5/2018 | Dolan et al. |
| 2018/0150982 A1* | 5/2018 | Lee ........................ G06Q 40/12 |
| 2019/0066069 A1* | 2/2019 | Faith ................ G06Q 20/3821 |
| 2019/0147420 A1* | 5/2019 | Young .................. G06Q 20/145 705/17 |
| 2020/0125322 A1* | 4/2020 | Wilde ...................... G06F 1/163 |
| 2020/0218899 A1* | 7/2020 | Lamont ................ G06T 19/006 |
| 2021/0103918 A1* | 4/2021 | Harmer ................ G06Q 20/385 |

\* cited by examiner

AUGMENTED REALITY VIRTUAL NUMBER GENERATION

BACKGROUND

A virtual credit card number can be a useful tool for protecting the actual credit card number during online transactions. Rather than transmitting the actual credit card number, a device may transmit the virtual number as part of the online transaction. Accordingly, the actual credit card number can be excluded from being transmitted over a network or stored remotely in a database. Virtual numbers can be discarded and the actual credit card number may be secured. But existing techniques for generating and using a virtual number are limited and generally tied to desktop browsers. Accordingly, virtual number usage has been inhibited by the lack of options for generating and using virtual numbers through different devices and applications.

BRIEF DESCRIPTION OF THE DRAWINGS/FIGURES

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for generating and utilizing a virtual number using an augmented reality application on a mobile device. Exemplary operations of the augmented reality application include providing a real-time view via the mobile device, processing a payment object shown via the real-time view, generating a virtual number based on processing of the payment object, and utilizing the generated virtual number. Providing the real-time view of the payment object may include utilizing an image capture device of the mobile device such as a rear-facing camera or cameras and displaying the payment object on a display screen of the mobile device. Examples of payment objects include debit cards or credit cards.

These techniques leverage improvements to technology in mobile devices—ever more sophisticated cameras, advancing imaging software, and powerful processors—to provide a novel way for generating virtual numbers for online transactions using augmented reality. These techniques provide an interface for generating virtual numbers for an account associated with the payment object. In some embodiments, the interface is part of an augmented reality application that overlays or superimposes the virtual numbers (and other virtual information, if needed) over the payment object that is displayed via the interface.

These techniques further provide novel methods for making the generated virtual numbers visible or otherwise available for use during an online transaction. As one example, the mobile device is implemented as a cell phone and a user of the mobile device is conducting an online transaction such as a purchase via a website accessed through a browser of the mobile device. When the online transaction indicates that payment is needed, a payment object may be provided in a real-time view of an augmented reality application. Upon detection, the augmented reality application may then identify the payment object as a credit card with payment information within the real-time view and may generate a virtual number and other virtual information (such as a virtual expiration date and/or a virtual card verification code (CVC)). The augmented reality application may then allow interaction with the virtual number to be used for the online transaction.

As another example, the mobile device may be implemented as an augmented reality wearable (e.g., glasses). The augmented reality application may be tailored to different devices to provide interfaces specific for each device. For example, when installed in a mobile device, the augmented reality application may accept touch-based inputs and voice input for interfacing with generated virtual numbers; when installed, in this example, with an augmented reality wearable, the augmented reality application may provide voice input or eye (or iris)-tracking input. The augmented reality application may provide other functions specific to each device such as "locking" the virtual number as an overlay in a predetermined area within a display screen of the augmented reality wearable such that the virtual number is viewable anywhere on the display screen, even when accessing other applications.

In view of the foregoing description and as will be further described below, the disclosed embodiments enable the generation of the virtual numbers associated with a payment object displayed in a real-time view of an interface. In particular, the embodiments allow virtual numbers to be manipulated for use during online transactions. In this manner, additional and novel interactions may be utilized to generate virtual numbers using a mobile device via an augmented reality application.

Various embodiments of these features will now be discussed with respect to the corresponding figures.

Figure 1:
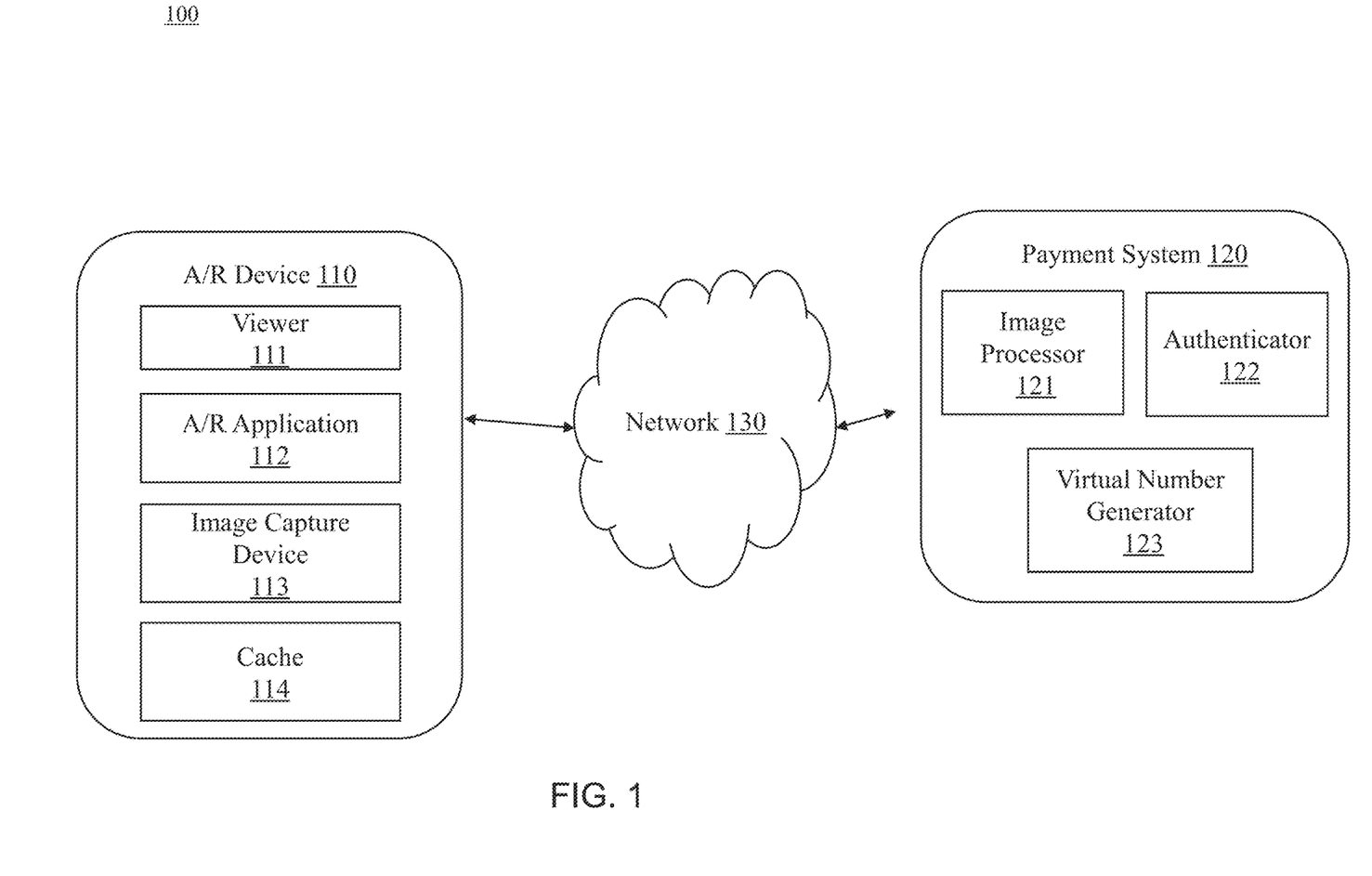
FIG. 1 depicts a block diagram of a system for implementing virtual number generation via an augmented reality application on a mobile device, according to some embodiments.

FIG. 1 depicts a block diagram of a system 100 for implementing virtual number generation via an augmented reality application on a mobile device, according to some embodiments. System 100 may include a mobile device 110, payment system 120, and network 130. Mobile device 110 may be connected to payment system 120 through network 130.

Mobile device 110 may include a device, such as a mobile phone (e.g., a smart phone, a radiotelephone, etc.), a tablet computer, a wearable communication device (e.g., a pair of smart eyeglasses, augmented reality headsets, etc.), or a similar type of device.

Mobile device 110 may include display 111 that displays a real-time view of a payment object that is within the field of vision of mobile device 110. Display 111 may be implemented differently based on the mobile device 110. For example, when mobile device 110 is implemented as a cell phone, display 111 may be a touch-screen display; when implemented as an augmented reality wearable, display 111 may be a heads-up display.

Mobile device 110 may also include augmented reality application 112 that provides a user interface for interacting with payment objects, generating virtual numbers associated with the payment objects, and utilizing the generated virtual numbers. For example, augmented reality application 112 may be implemented to provide an interface for using image capture device 113 (discussed further below) to display a real-time view on display 111. Augmented reality application 112 may also include an interface that allows users to interact with and otherwise manipulate payment objects displayed in the real-time view provided by image capture device 113. A real-time view refers to a preview or live view that allows the display of mobile device 110 to be used as a viewfinder. Augmented reality application 112 may implement the real-time view as an augmented reality viewer that provides augmented reality interfaces over payment objects that are displayed within the real-time view.

In some embodiments, augmented reality application 112 communicates with payment system 120 over network 130 in order to generate virtual number information associated with a payment object. Virtual number information includes payment information associated with an account of the payment object such as a virtual number, a virtual expiration date and a virtual card verification code.

In some embodiments, graphical user interfaces provided by augmented reality application 112 are provided as an overlay (or overlays) within the real-time view. For example, augmented reality application 112 may display a real-time view that includes payment objects. Augmented reality application 112 may then also display an overlay(s) (e.g., a generated virtual number) over each of the payment objects. The overlay may be capable of being manipulated in some fashion such as moved to another portion of display 111, transferred to another application (e.g., browser) also installed on mobile device 110 or a separate device (e.g., a laptop or tablet). In this manner, augmented reality application 112 allows for virtual selection and subsequent storage location creation associated with any of the objects that are displayed within the real-time view.

In some embodiments, augmented reality application 112 includes object detection and recognition capability for performing an analysis of the real-time view and automatically detecting payment object(s) in the real-time view. Detection of objects may include determining that an object shown in the real-time view is a payment object (e.g., whether the object is a credit card or debit card), determining that the payment object is associated with an account for which virtual numbers may be generated (e.g., augmented reality application 112 is linked to a specific card issuer) and detecting the presence of payment information provided by the payment object (e.g., the account number, expiration date, card verification code). In some embodiments, augmented reality application 112 includes scanning the payment object using optical character recognition (OCR) for detecting written text displayed in the real-time view on the payment object. In some embodiments, augmented reality application 112 generates overlays based on the detected payment information part of the object detection process. For example, a real-time view may dynamically display generated virtual number information over any portion of the detected payment object; in other embodiments, the generated virtual number information is pinned to a specific part of the display such that the information is displayed outside of augmented reality application 112.

To perform object recognition, augmented reality application 112 may capture data from image capture device 113 as images and may use a real-time object recognition function to recognize objects displayed in the real-time view. After real-time object recognition is performed, augmented reality application 112 may provide an interface for interacting with the detected payment object and for generating virtual number information. For example, in the real-time view, augmented reality application 112 may dynamically detect payment information fields on the payment object, and display, as an overlay over each field, the generated virtual number information associated with each field. For example, the virtual number may be displayed over the actual account number, the virtual expiration date may be displayed over the actual expiration date, and the virtual card verification code may be displayed over the actual card verification code.

In some embodiments, when generating virtual number information associated with a payment object, augmented reality application 112 may require multiple images of the payment object. Multiple images of the front and back of the payment object may be required so that all necessary payment information is detected (e.g., the card verification code may be located on a side opposite to the account number).

In some embodiments, augmented reality application 112 may generate the virtual number information automatically upon detection of the necessary conditions. For example, during an online transaction, augmented reality application 112 may be accessed which provides an on-screen prompt for the placement of a payment object to be visible within the real-time view. Once an object is in the real-time view, augmented reality application 112 may then automatically perform steps for detecting whether the object is a payment object and whether the payment object is associated with an account for which augmented reality application 112 may generate a virtual number. Once those conditions are met, augmented reality application 112 may then automatically proceed with generating the virtual number information or receiving the virtual number from payment system 120 and displaying the generated virtual number information on display 111 in relation to the detected payment object. Augmented reality application 112 may also operate in the background to allow the virtual number information to be displayed and visible when the user switches to another program such as a browser to continue the online transaction.

In some embodiments, these steps may be performed entirely by augmented reality application 112. In other embodiments, augmented reality application 112 may communicate with payment system 120 at any point of this process in order to verify the results of the determination. Payment system 120 may also require augmented reality application 112 to transmit the detected information for verification. Payment system 120 may also be responsible for receiving a request from augmented reality application 112, generating a virtual number based on the request, and transmitting the virtual number to augmented reality application 112.

When the virtual number information is provided as an overlay over a payment object, it may be selected and manipulated within the real-time view via user input. The interface may include functions for selecting the virtual number information, copying the virtual number information, transferring the virtual number information from augmented reality application 112 to another application on mobile device 110, and receiving user input for placing the selected augmented object at different locations within the real-time view.

Augmented reality application 112 may also include authentication features to verify the identity of a user. In some embodiments, image capture device 113 may include multiple cameras including rear facing and front facing cameras (discussed more below) and augmented reality application 112 may utilize the front facing camera to perform facial recognition of the user while performing the functions discussed above including detection of a payment object. In an example, augmented reality application 112 may include an onscreen prompt for a payment object to be placed within view of the rear-facing camera in order to perform the detection functions. While performing those functions, augmented reality application 112 may cause the front facing camera to perform facial recognition of the user holding the phone in order to authenticate the user while detection functions are performed by rear facing camera. In an embodiment, augmented reality application 112 may require, for authentication, a view from the front facing camera concurrently with the detection functions to increase the security of the functions.

Accordingly, in this embodiment, augmented reality application 112 may only generate virtual numbers after authenticating the user. In other embodiments, the generated virtual number information may be available prior to authenticating the user but may be hidden from display until after the user is authenticated. In an embodiment, the virtual number information refers to may be initially hidden even if it is available and ready for displayed in a real-time view of augmented reality application 112. Once the user is authenticated, such as through facial recognition through image capture device 113 or through some other mechanism (e.g., fingerprint, voice authentication, username/password), augmented reality application 112 may provide, as an overlay, the generated virtual number information in a predetermined area of the real-time view, such as over the payment object.

In some embodiments, the displayed virtual number information may be selectable. Selection of the virtual number information may bring up a menu of options such as copying the virtual number information, locking the virtual number information on display 111, and transferring the virtual number information to another application on mobile device 110.

In embodiments where mobile device 110 is implemented as an augmented reality wearable device, augmented reality application 112 may include functionality for receiving user input via voice commands or tracking eye (or iris) movements.

In some embodiments, image capture device 113, such as a camera, includes hardware components for displaying a real-time view of the physical surroundings in which mobile device 110 is used. Image capture device 113 may support one or more image resolutions. In some embodiments, an image resolution may be represented as a number of pixel columns (width) and a number of pixel rows (height), such as 1280×720, 1920×1080, 2592×1458, 3840×2160, 4128×2322, 5248×2952, 5312×2988, or the like, where higher numbers of pixel columns and higher numbers of pixel rows are associated with higher image resolutions.

In some embodiments, image capture device 113 may be implemented using one or more camera lenses with each lens having different focal lengths or different capabilities. For example, image capture device 113 may include a wide-angle lens (e.g., 18-35 mm), a telephoto (zoom) lens (e.g., 55 mm and above), a lens with a depth sensor, a lens with a monochrome sensor, and/or a "standard" lens (e.g., 35-55 mm). Determining a depth of field may be calculated using a dedicated lens having a depth sensor or using multiple camera lenses (e.g., telephoto lens in combination with a standard lens).

In some embodiments, the determined distance or depth between image capture device 113 and the payment object may be used to determine a relative location of the payment object. The relative location of the object refers to the spatial relationship between the payment object and surrounding objects, such as image capture device 113. The relative location may be used by augmented reality application 112 to verify that the payment object is appropriately located in relation to mobile device 110 to allow generating the virtual number information.

In some embodiments, implementation of augmented reality application 112 may be dependent on the number of camera lenses implemented in image capture device 113. For example, there may be one implementation of augmented reality application 112 that is configured specifically for mobile device 110 when it implements image capture device 113 with a single-lens. In this example, augmented reality application 112 could be implemented with additional functions to perform distance calculations between image capture device 113 and the payment object.

In some embodiments where mobile device 110 is implemented as an augmented reality wearable, image capture device 113 may include a camera for tracking eye (or iris) movements of the user and transmitting the tracked movements to augmented reality application 112 for use as user input. As an example, eye movements may be correlated to movement of a cursor for selecting or otherwise interacting with the payment object and the generated virtual number information.

As another example, there may be another implementation of augmented reality application 112 that is configured specifically for mobile device 110 when it implements image capture device 113 with multiple lenses. In this example, augmented reality application 112 may take advantage of the different capabilities of each lens in performing its object detection and analysis. For example, one lens may be configured to recognize the lighting in the real-time view and can distinguish between different lighting artifacts such as glare or low light; an ultra-wide-angle lens can support wide-angle shooting and can capture additional details regarding objects surrounding the payment object; yet another lens may be a telephoto lens which supports optical zoom to capture specific details regarding the payment object. Augmented reality application 112 may then utilize the information provided by each lens of image capture device 113 for not only identifying the payment object within real-time view but also identifying particular characteristics regarding the environment to improve the optical recognition capability. In this manner, augmented reality application 112 may be tailored to the capabilities of mobile device 110 while still providing the complete functionality as described in this disclosure.

In some embodiments, image capture device 113 may support a first image resolution that is associated with a quick capture mode, such as a low image resolution for capturing and displaying low-detail preview images on a display of the user device. In some embodiments, image capture device 113 may support a second image resolution that is associated with a full capture mode, such as a high image resolution for capturing a high-detail image. In some embodiments, the full capture mode may be associated with the highest image resolution supported by image capture device 113. In some embodiments, mobile device 110 may send the captured payment object, via network 130, to payment system 120 for processing and/or validating the captured payment object. In some embodiments, mobile device 110 may receive a message or any other type of information from the payment system 120, which may be displayed on mobile device 110 via an overlay or interface provided by augmented reality application 112.

In some embodiments, mobile device 110 may include cache 114. Cache 114 may be implemented as a memory for storing virtual number information associated with payment objects determined through augmented reality application 112. Cache 114 may include associated storage settings such as the duration that virtual number information may be stored in cache 114. The duration may be based on the level of security that can be set by user of mobile device 110 or by augmented reality application 112. For example, a duration may be set to a particular time period during which the virtual number information is stored and accessible to augmented reality application 112. This storage option may allow, for example, the virtual number to be retrievable by augmented reality application 112 even when the payment object is not viewable through display 111 such as if the user shifts the position of mobile device 110. In this example, when the user moves mobile device 110 such that the payment object is again viewable in display 111, augmented reality application 112 may (1) detect that the payment object is the same as the payment object that was previously detected and (2) retrieve the virtual number information from cache 114 and automatically display the retrieved virtual number information without any further input from the user. In some embodiments, virtual number information is linked with payment object information in cache 114 to enable augmented reality application 112 to perform these determinations.

In another example, a stricter security level may be set such that the virtual number information is automatically deleted from cache 114 when the associated payment object is no longer viewable through display 111. In this example, virtual number information is to be generated for each payment object that is detected by augmented reality application 112.

Mobile device 110 may also include location sensor 115 which can be used for determining a location of mobile device 110. Examples of location sensor 115 include any combination of a global position system (GPS) sensor, a digital compass, a velocimeter (velocity meter), and/or an accelerometer. Location sensor 115 may work in combination with augmented reality application 112 and image capture device 113 to provide location information associated with payment objects detected by augmented reality application 112 and image capture device 113. The location information may be used in an authentication process. For example, augmented reality application 112 may include a selectable setting for establishing trusted locations for which virtual numbers can be generated. For example, if mobile device 110 is utilized at a trusted location (e.g., longitude and latitude coordinates as provided by location sensor 115), virtual number information may be generated for payment objects that are detected at that certain location (e.g., by augmented reality application 112 and image capture device 113). Augmented reality application 112 therefore can link virtual number information, payment objects with location information.

In some embodiments, trusted areas may allow for additional functionality such as increased duration for which virtual number information can be stored in cache 114. For example, augmented reality application 112 may provide a storage setting for storing virtual numbers longer when they are generated in a "home" location (e.g., greater than 10 minutes) compared to when they are stored outside of the "home" location (e.g., erase immediately after use). In this manner, virtual numbers may be stored and utilized for a longer period when the user is at home compared to any other location which increases the security of the virtual numbers as well their usefulness for conducting multiple online transactions.

In some embodiments, virtual number information may be stored in cache 114 but is only useable or accessible when location sensor 115 indicates that mobile device 110 is located in a trusted area. For example, augmented reality application 112 may lock or otherwise prevent access to any virtual number information unless location sensor 115 indicates that mobile device 110 is located in a trusted area. Augmented reality application 112 may use the location information of a trusted area that is set by a user to encrypt or otherwise securely store the virtual number information in cache 114. Using the location information in this manner would require mobile device 110 to be in the same physical and/or relative location in order to access the virtual number information. When using location information in this manner, the current location of mobile device 110 is used as a key for encrypting and decrypting the virtual number information to be stored in cache 114. For example, when attempting to access virtual number information at home, the current location of mobile device 110 (e.g., longitude and latitude) may be received from location sensor 115 and may be used as a key for decrypting the virtual number information. If the current location of mobile device 110 is the same as the location that was used when storing the virtual number information, then decryption would be successful.

In an embodiment where location sensor 115 is implemented as a GPS sensor, augmented reality application 112 may query location sensor 115 for GPS coordinates to augmented reality application 112 at the time the real-time view is displayed and any objects are detected within the real-time view.

Payment system 120 may include a server device (e.g., a host server, a web server, an application server, etc.), a data center device, or a similar device, capable of communicating with mobile device 110 via network 130. Payment system 120 may include payment object processor 121, authenticator 122, and virtual number generator 123. In some embodiments, payment system 120 may implemented as a plurality of servers that function collectively as a cloud database for storing data received from mobile device 110.

In some embodiments, payment system 120 may be used to store the information provided by augmented reality application 112. Collectively, payment object processor 121 and authenticator 122 may perform the functions described above for augmented reality application 112 including processing the payment object information and generating virtual numbers. In other embodiments, payment object processor 121 and authenticator 122 work in conjunction with augmented reality application 112 to achieve the described functions.

Payment object processor 121 processes payment object information provided by augmented reality application 112. Instead of processing payment object information locally in mobile device 110, mobile device 110 may send the payment object information to payment system 120 to perform the processing remotely or to offload some of the processing. Examples of processing include object detection, OCR, and generation of virtual numbers as discussed above with respect to mobile device 110.

Authenticator 121 may be used to authenticate user or location information and encrypt/decrypt virtual number information based on information provided by mobile device 110. Virtual number generator 123 generates virtual numbers and transmits them to augmented reality application 112. In some embodiments, virtual number generator 123 works in combination with augmented reality application 112. Augmented reality application 112 may issue commands directly to virtual number generator 123.

Network 130 may include one or more wired and/or wireless networks. For example, the network 130 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Figure 2A:
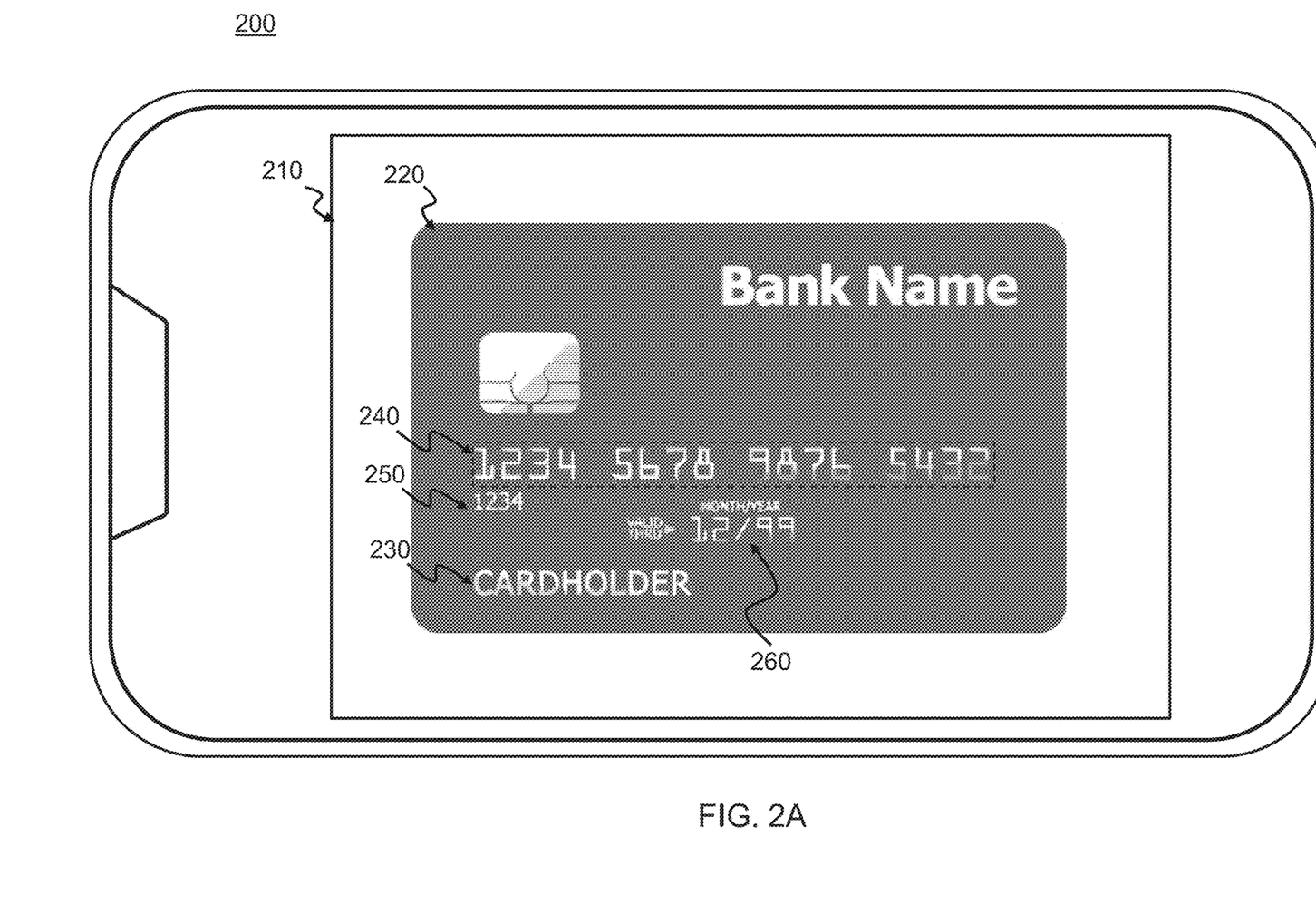
FIG. 2A depicts a block diagram of an exemplary mobile device displaying a real-time view, according to some embodiments.

FIG. 2A depicts a block diagram of a mobile device 200 displaying a real-time view 210 of a payment object, according to some embodiments. In some embodiments, mobile device 200 represents an implementation of mobile device 110 of FIG. 1. Mobile device 200 may include a real-time view 210 (e.g., provided by augmented reality application 112). As noted above, in some embodiments, real-time view 210 provides a preview or live view that allows the display of mobile device 200 to be used as a viewfinder. In this embodiment, real-time view 210 may provide a view of payment object 220, and payment object information that includes cardholder name 230, account number 240, card verification code 250, expiration date 260, and card issuer name 270.

Figure 2B:
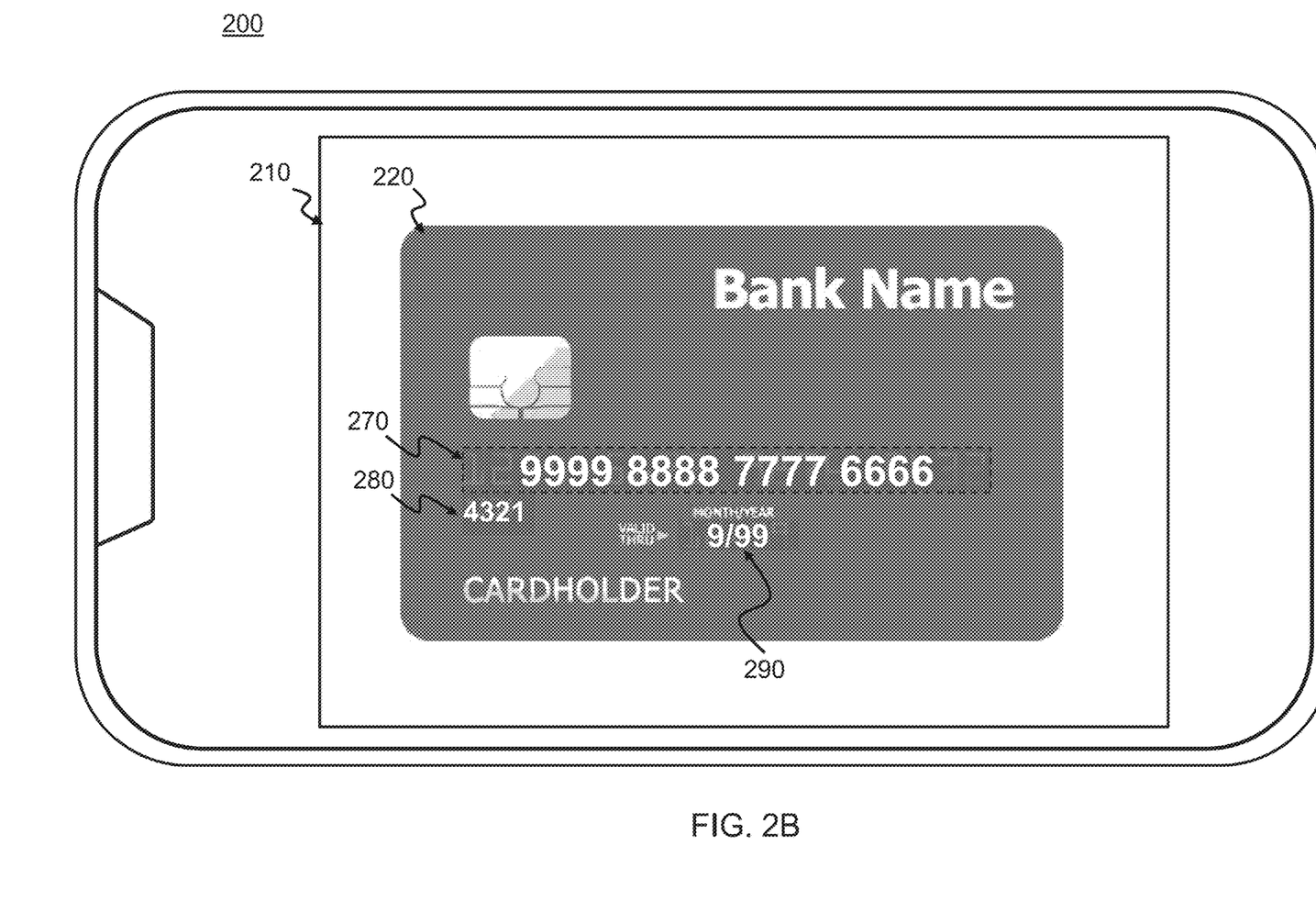
FIG. 2B depicts a block diagram of an exemplary mobile device displaying a real-time view with a virtual number overlay, according to some embodiments.

FIG. 2B depicts a block diagram of mobile device 200 displaying a real-time view 210 with overlays including a virtual number overlay 240A, virtual card verification code 250A, and virtual expiration date 260A, according to some embodiments. The overlays are examples of virtual information that are displayed based on detected payment object information. In an embodiment, the overlays are displayed over the corresponding payment object information; for example, virtual number overlay 240A may be displayed over the account number, virtual card verification code 250A may be displayed over the card verification code, and virtual expiration date 260A may be displayed over the expiration date. The overlays may be aligned over the corresponding information from the payment object using a combination of image capture device 113, augmented reality application 112, and display 111. The overlays may be positioned anywhere within real-time view 210. Overlays may be selectable via a user input. Selection of an overlay may result in additional menus being displayed or being positioned to a different location of real-time view 210.

Figure 2C:
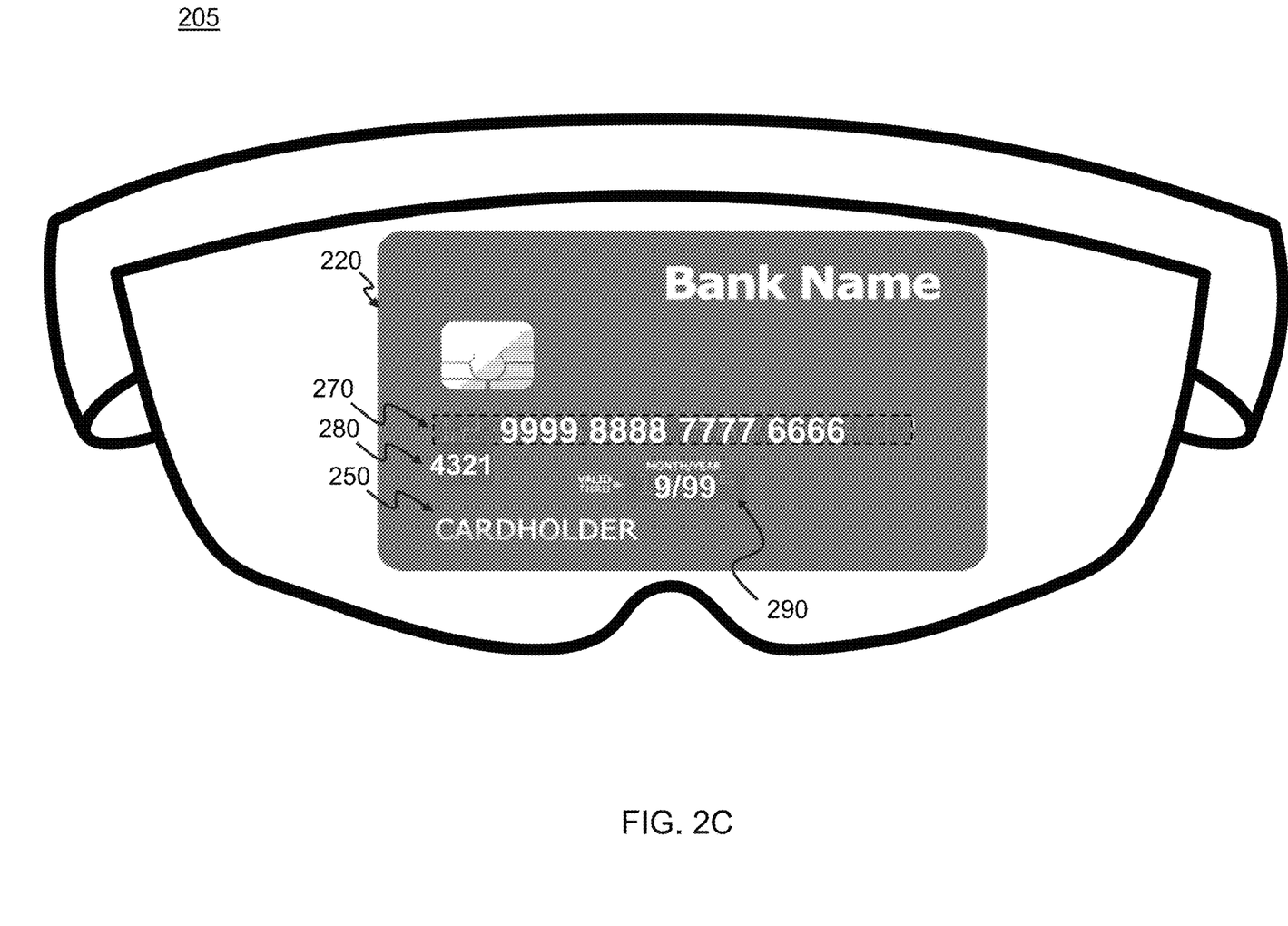
FIG. 2C depicts a block diagram of an exemplary mobile device displaying a real-time view with a virtual number overlay, according to some embodiments.

FIG. 2C depicts a block diagram of mobile device 205 displaying a real-time view 210 with overlays including a virtual number overlay 240A, virtual card verification code 250A, and virtual expiration date 260A, according to some embodiments. In some embodiments, mobile device 205 represents an implementation of mobile device 110 of FIG. 1. In this embodiment, mobile device 205 may be implemented as an augmented reality wearable and the overlays are projected onto a viewer of the augmented reality wearable. The overlays may be aligned over the corresponding information from the payment object using a combination of image capture device 113, augmented reality application 112, and display 111. The overlays are examples of virtual information that are displayed based on detected payment object information. In an embodiment, the overlays are displayed over the corresponding payment object information; for example, virtual number overlay 240A may be displayed over the account number, virtual card verification code 250A may be displayed over the card verification code, and virtual expiration date 260A may be displayed over the expiration date. The overlays may be positioned anywhere within real-time view 210.

Figure 2D:
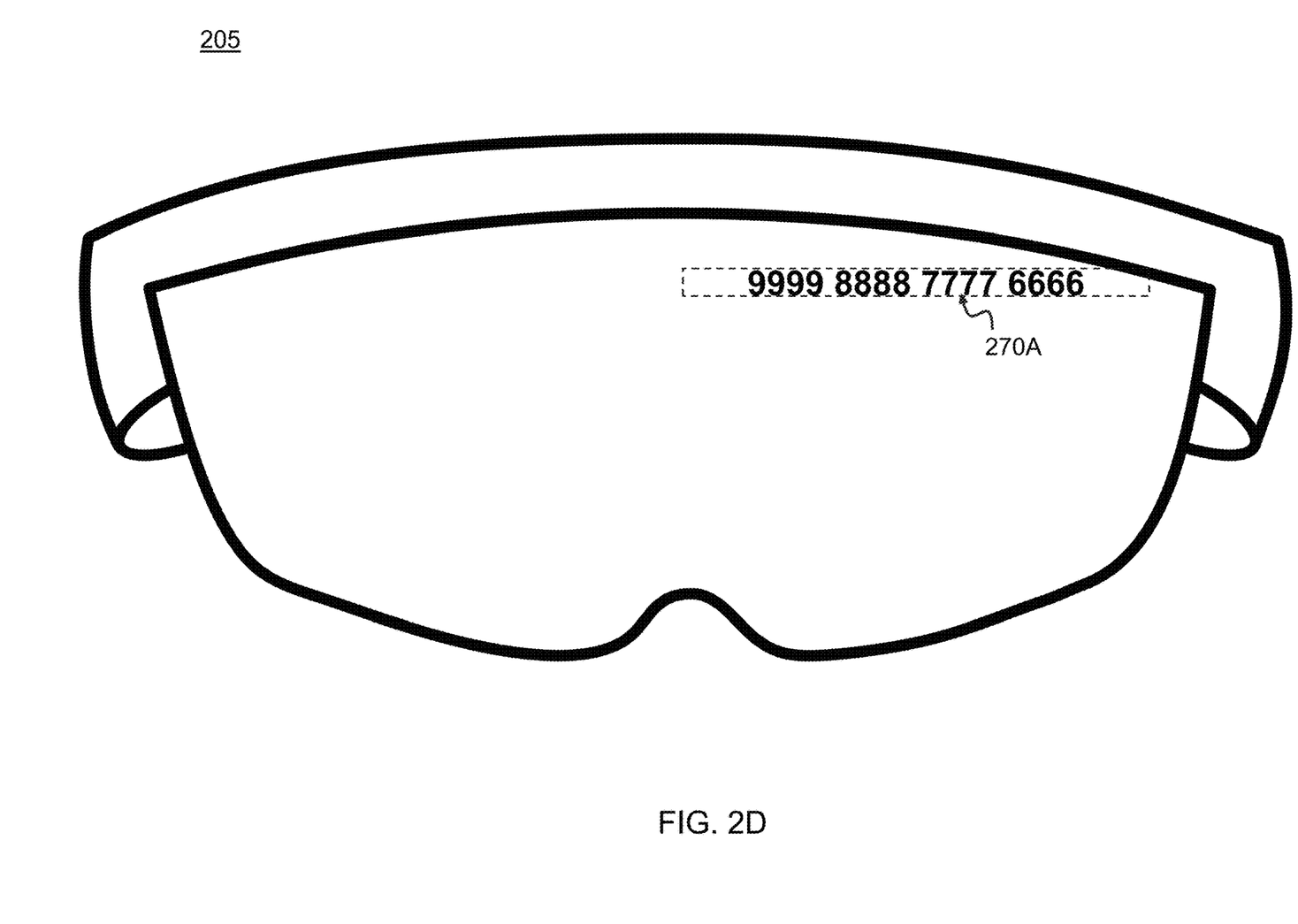
FIG. 2D depicts a block diagram of an exemplary mobile device displaying a virtual number overlay, according to some embodiments.

FIG. 2D depicts a block diagram of mobile device 205 displaying a virtual number overlay 240A, according to some embodiments. In this embodiment, virtual number overlay 240A is positioned in a predetermined area of the display of mobile device 205 such that virtual number overlay 240A is viewable outside of a real-time view. In this manner, virtual number overlay 240A may be "pinned" on the display so that mobile device 205 may be directed away from the payment object and the user of mobile device 205 may conduct other activities, such as continuing an online transaction. With the virtual number overlay 240A viewable on the display even when the payment object is not present, the user may be able to easily continue the online transaction by viewing the "pinned" virtual numbers and being able to enter them onto a screen of another device that is being used for the online transaction.

Figure 3:
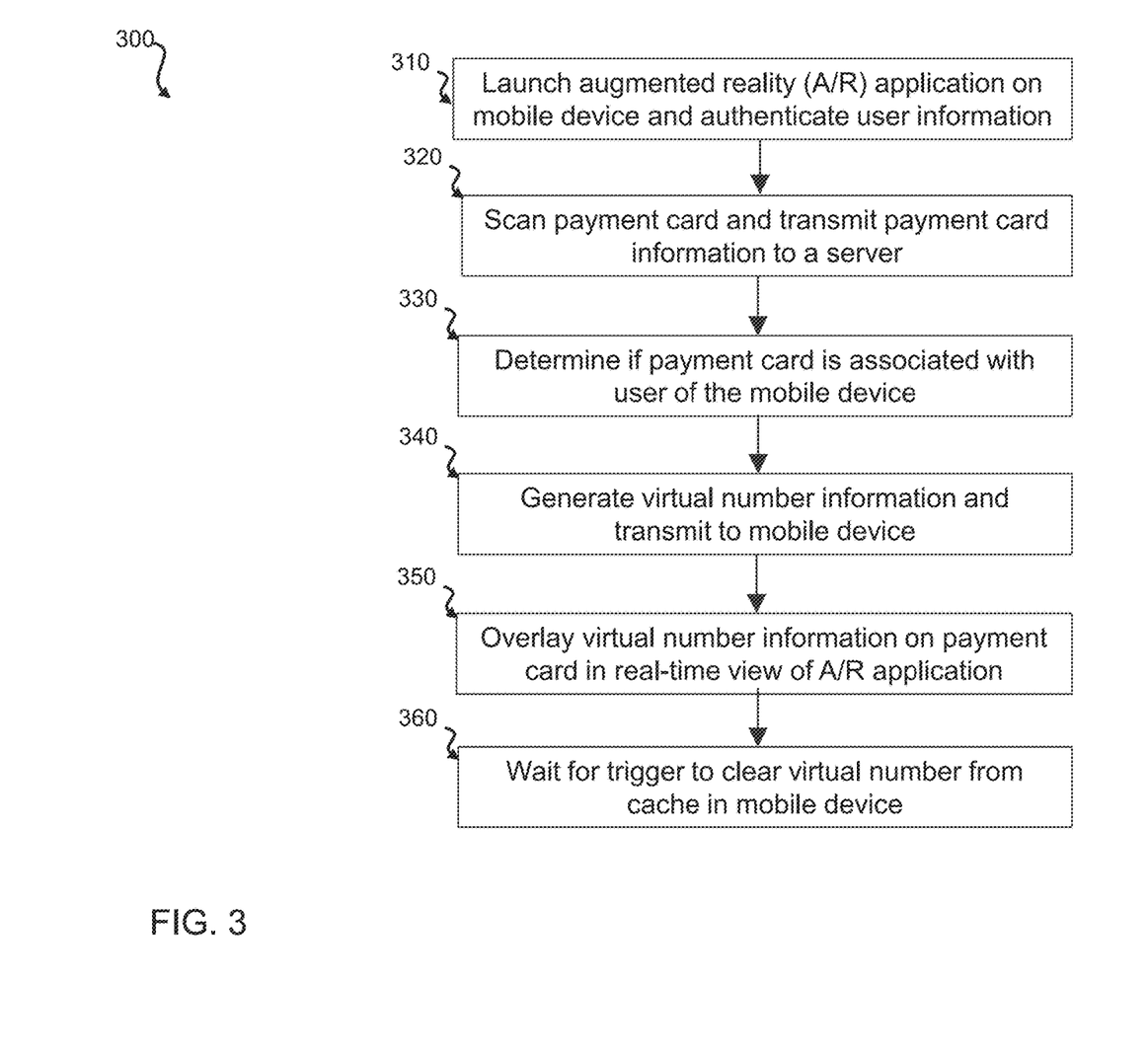
FIG. 3 depicts a flow diagram illustrating a flow for generating a virtual number using an augmented reality application, according to some embodiments.

FIG. 3 depicts a flow diagram illustrating a flow for generating a virtual number using an augmented reality application, according to some embodiments. As a non-limiting example with regards to FIGS. 1 and 2A-2D, one or more processes described with respect to FIG. 3 may be performed by a mobile device (e.g., mobile device 110 of FIG. 1) or a server (e.g., payment system 120 of FIG. 1) for detecting a payment object and generating virtual number information. In such an embodiment, mobile device 110 and/or payment system 120 may execute code in memory to perform certain steps of method 300 of FIG. 3. While method 300 of FIG. 3 will be discussed below as being performed by mobile device 110 and/or payment system 120, other devices may store the code and therefore may execute method 300 by directly executing the code. Accordingly, the following discussion of method 300 will refer to devices of FIGS. 1, 2A-D as an exemplary non-limiting embodiment of method 300. Moreover, it is to be appreciated that not all steps may be needed to perform the disclosure provided herein. Further, some of the steps may be performed simultaneously or in a different order than shown in FIG. 3, as will be understood by a person of ordinary skill in the art.

In 310, augmented reality application 112 of mobile device 110 may be launched and user authentication may be performed. In an embodiment, the user information is authenticated prior to allowing access to the launched augmented reality application 112. In some embodiments, user authentication may be performed using facial recognition, fingerprint verification, username/password, iris verification, or some combination of these techniques. Launching of the augmented reality application 112 may be performed in response to a user action outside of the augmented reality application 112 such as from another application on mobile device 110. Augmented reality application 112 may monitor actions of other applications such as, for example, a browser and may detect the user is in the process of an online transaction that requires input of payment information, such as a credit card. Upon detection of certain actions by the user or other applications, augmented reality application 112 may launch automatically. In other embodiments, a specific user action may be required to perform the launch.

In 320, augmented reality application 112 detects a payment object using, for example, image capture device 113 and determines the payment object information from the payment object. In an embodiment, when the payment object is within view of image capture device 113, augmented reality application 112 processes the payment object to determine that it is a payment object that includes relevant payment object information. This may be done using OCR of an image taken from the real-time view that includes the payment object. In an embodiment, the payment object information includes any necessary information for completing an online transaction such as the account number, expiration date, and card verification code. In an embodiment, one or more of this information may be located on different sides of the payment object. If so, in an embodiment, augmented reality application 112 may determine that certain information is missing from the side of the payment object that is currently viewable by image capture device 113 and will provide a prompt for the payment object to be flipped over so that the other side is viewable and the additional payment object information may be captured by image capture device 113.

In 330, augmented reality application 112 determines if virtual number information can be generated for the detected payment object. In some embodiments, augmented reality application 112 may perform this determination; in other embodiments, augmented reality application 112 may communicate the detected payment object information to payment system 120 which may then perform the determination and transmit a response to augmented reality application 112. In some embodiments, whether it is performed by augmented reality application 112 or payment system 120, this determination may include processing the payment object information to determine that the payment object is associated with payment system 120. For example, if the payment object is determined to be a Bank X credit card and payment system 120 is affiliated with Bank X, then payment system 120 is capable of generating virtual numbers of the payment object. But in that example, payment system 120 may not be capable of generating virtual numbers for a payment object that is determined to be from Bank Y or Bank Z. In some embodiments, this determination may include using a combination of the user information and payment object information. For example, user information may be used to authenticate the user, the payment object information may be used to authenticate the card, and a determination may be made to determine that the user is associated with the payment object information.

In 340, augmented reality application 112 may proceed with generating the virtual number information. In some embodiments, this may be performed by payment system 120 which would transmit the virtual number information to augmented reality application 112. Examples of virtual number information include virtual card numbers, virtual expiration dates, and virtual card verification codes. Generation of the virtual numbers may be based on the detected payment object information or may be generated randomly. In some embodiments, this step may include storing the virtual number information in cache 114 according to any storage settings established by the user or required by payment system 120. In the embodiment when payment system 120 generates the virtual numbers, payment system 120 may include the storage settings with the transmission of the virtual numbers that control how the virtual numbers are to be stored within cache 114.

In 350, in an embodiment, augmented reality application 112 may overlay the virtual number information in a real-time view. In some embodiments, this step may include overlaying the virtual number information directly over the corresponding payment object information fields detected on the payment object. In another embodiment, certain payment object information fields may be located on different sides of the payment object. One example may be a card verification code which may be located on a second side of the payment object where the account number and expiration date may be located on a first side (opposite the second side). In this example, the corresponding virtual number information, such as virtual card verification code 250A, may be displayed on the first side of the payment object with the other payment object information even though the actual card verification code is located on the opposite side. Any position within the real-time view that is provided on the display 111 may be selected that does not interfere with the display of the virtual number information. Accordingly, for the user's convenience, virtual card verification code 250A may be displayed on the same side of the payment object on which the other virtual number information (e.g., virtual number overlay 240A and virtual expiration date 260A) is displayed.

In 360, augmented reality application 112 may receive user input responsive to overlaying the virtual number information. The user input may be a request to manipulate the virtual number such as by copying the virtual number information, positioning the virtual number information in a different location of real-time view, or transferring the virtual number to another application installed on mobile device 110. In some embodiments, the virtual number information may be manipulated in accordance with the user input as well as certain settings associated with the virtual number information. For example, one setting may be a "pin" setting that pins the virtual number information in the real-life display provided by augmented reality application. When pinned, the virtual number information may be retrieved from cache as needed by augmented reality application 112 (and in accordance with any storage settings associated with the virtual number information). For example, if the payment object is no longer in view, the overlay with the virtual number information may be removed from the real-time view; when the payment object returns to review (and it is determined to be the same payment object), then the virtual number information may be displayed again as an overlay (e.g., retrieved from cache 114) without having to generate new virtual number information. In this manner, virtual number information does not need to be generated each time a payment object is detected. Accordingly, in some embodiments, storing the virtual number information requires storing the associated payment object information to allow augmented reality application 112 to determine the relationship between generated virtual number information and the payment object.

In 370, augmented reality application 112 waits for a trigger to clear the virtual number from cache 114. This trigger may be established by a storage setting that may be set by a user or that is established by payment system 120 when the virtual number information was generated. Examples of a trigger include a condition when payment object is detected to be not viewable in the real-time view, a certain time duration set by the user or payment system 120, a user action manually clearing the cache, or a condition that the virtual number has been used a predetermined number of times. The predetermined number may be established by augmented reality application 112 or payment system 120 and may allow the virtual number information be used for a number of different transactions prior to be being cleared from cache. In some embodiments, this may include augmented reality application 120 receiving an indication from payment system 120 that the virtual number information has been used in a transaction.

Figure 4:
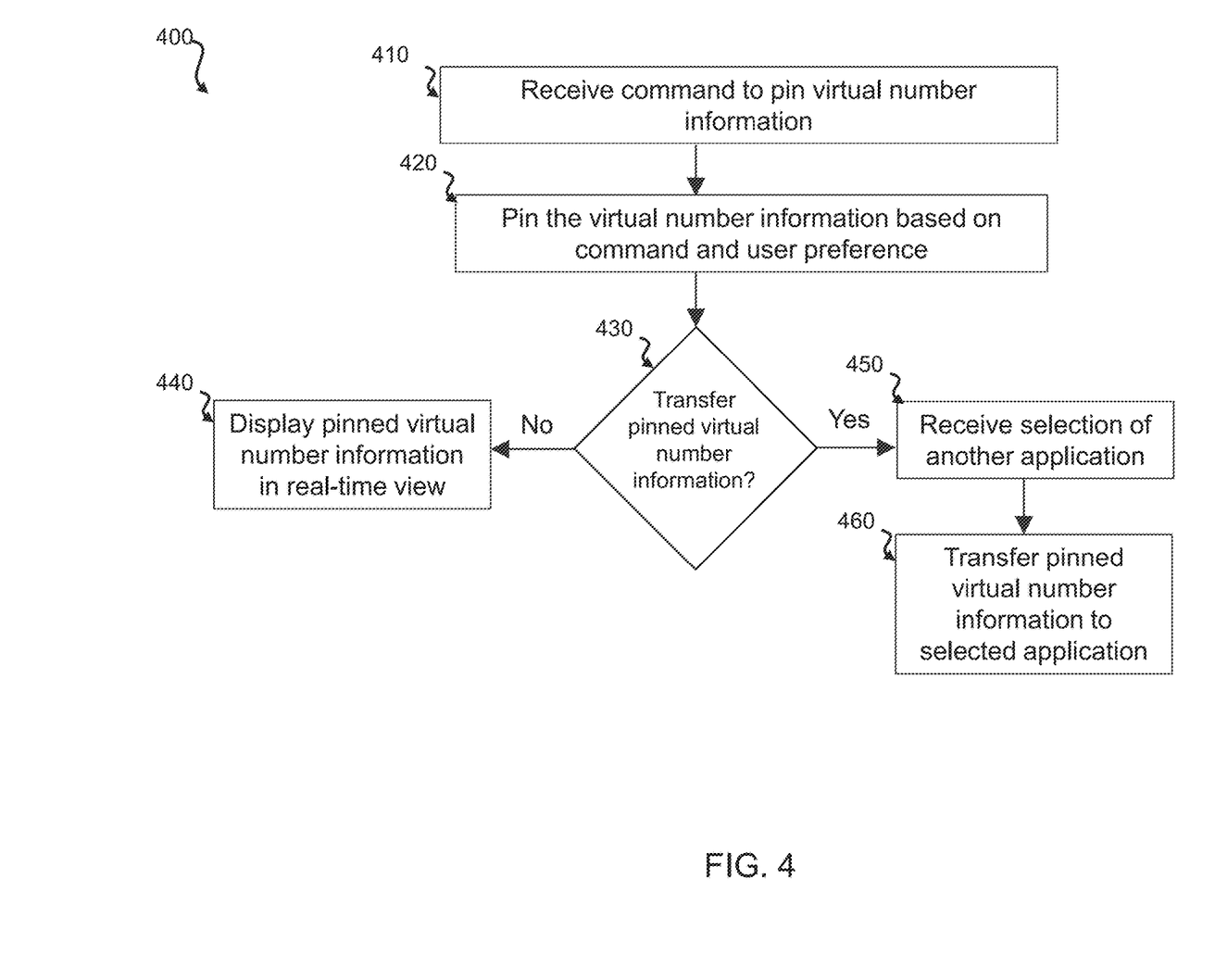
FIG. 4 depicts a flow diagram illustrating a flow for processing a generated virtual number, according to some embodiments.

FIG. 4 depicts a flow diagram illustrating a flow for processing a generated virtual number, according to some embodiments, according to some embodiments. As a non-limiting example with regards to FIGS. 1, 2A-D, one or more processes described with respect to FIG. 4 may be performed by a mobile device (e.g., mobile device 110 of FIG. 1) or a server (e.g., payment system 120 of FIG. 1) for detecting a payment object and generating virtual number information. In such an embodiment, mobile device 110 and/or payment system 120 may execute code in memory to perform certain steps of method 400 of FIG. 4. While method 400 of FIG. 4 will be discussed below as being performed by mobile device 110 and/or payment system 120, other devices may store the code and therefore may execute method 400 by directly executing the code. Accordingly, the following discussion of method 400 will refer to devices of FIGS. 1, 2A-D as an exemplary non-limiting embodiment of method 400. Moreover, it is to be appreciated that not all steps may be needed to perform the disclosure provided herein. Further, some of the steps may be performed simultaneously or in a different order than shown in FIG. 4, as will be understood by a person of ordinary skill in the art.

In 410, augmented reality application 112 of mobile device 110 receives a command to pin virtual number information. In embodiments where mobile device 110 is implemented as a cellular phone or an augmented wearable device, pinning the virtual number information may mean persistently displaying the virtual number information even outside of augmented reality application 112 such that the virtual number information is visible when other applications are launched on mobile device 110. Pinning the virtual number information may also involve persistently caching the virtual number information until it is transferred for use by another application as part of an online transaction.

In 420, augmented reality application 112 determines settings associated with the virtual number information. Examples of settings include positions where the virtual number information should be displayed, whether the virtual number information should be transferred to another application installed on mobile device 110, and duration for how long the virtual number information should be displayed.

In 430, augmented reality application 112 determines, based on the settings, whether to perform a transfer operation. If no, at 440, augmented reality application 112 displays the virtual number information in a real-time view in accordance with the settings that were determined in 420. When displayed, the user may continue to use mobile device 110 such as by launching another application, or moving mobile device 110 such that payment object is no longer visible. In an embodiment where mobile device 110 is implemented as an augmented reality wearable, the user may shift the mobile device 110 (and image capture device 113) from viewing the payment object to another device such that the payment object is not within view. The user may still view the pinned virtual number information but may now use the other device such as by inputting the displayed virtual number information into the other device.

If yes, in 450, augmented reality application 112 receives a selection of another application installed on mobile device 110 or another device that is connected to mobile device 110 through a wireless connection. Examples of other devices may include other mobile devices such as cellular phones, tablets, or laptops. As an example, a user may be online shopping on a first device and uses a second device (e.g., mobile device 110) to generate the virtual number information. Accordingly, if augmented reality application 112 detects another device that is connected to mobile device 110 (e.g., via a wireless connection such as Bluetooth), augmented reality application 112 may provide an on-screen prompt for a selection of an application that is installed on mobile device 110 as well as the other device for which to transfer the virtual number information.

In 460, augmented reality application 112 may then transfer the virtual number information to the selected application which may then utilize the virtual number information in an online transaction. As an example, the selected application may be a browser that is currently being used as part of an online transaction and that is on a webpage with certain payment fields. In some embodiments, augmented reality application 112 may transfer the virtual number information directly to the payment fields of the application.

Figure 5:
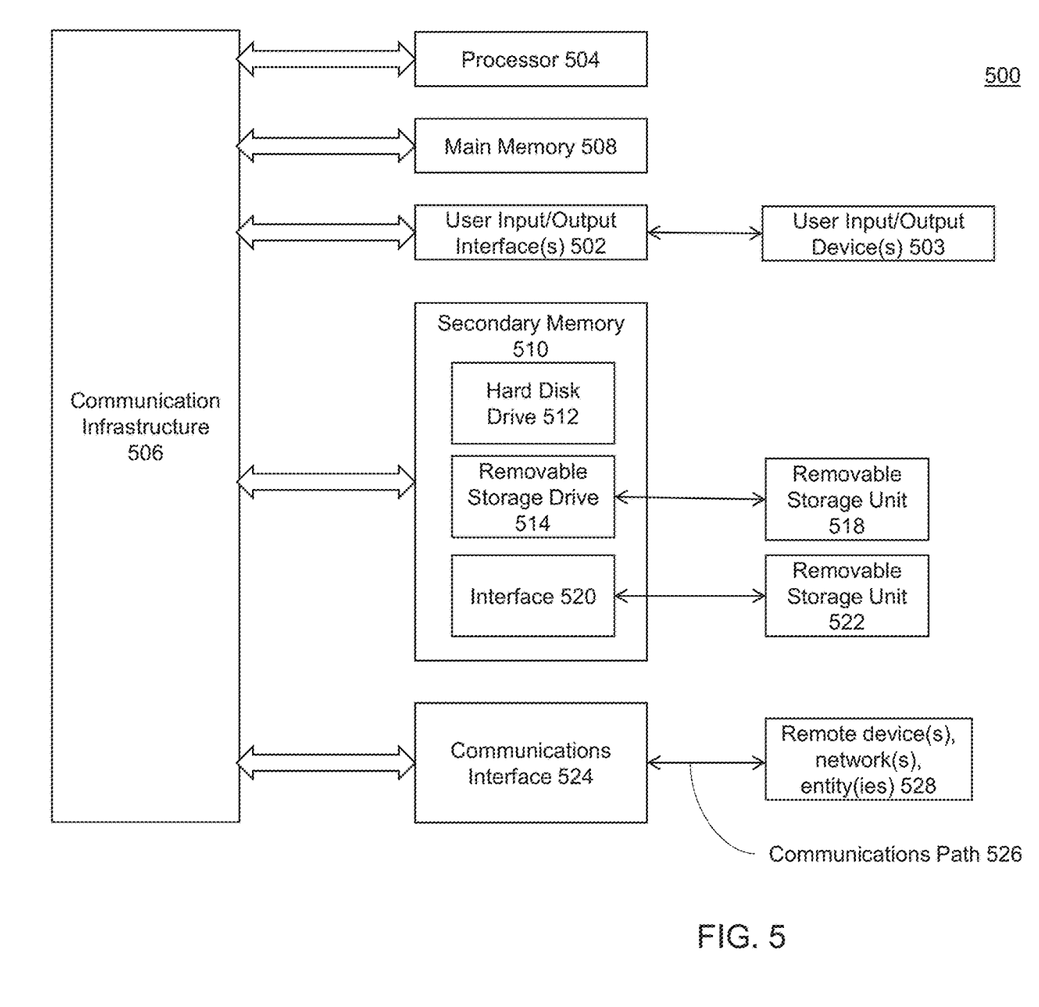
FIG. 5 depicts an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, a tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/or any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed:

1. A computer-implemented method for generating a virtual number on a mobile device, the method comprising:
    displaying, by an augmented reality application of the mobile device, a real-time view;
    detecting, by the augmented reality application, a payment object within the real-time view;
    scanning, by the augmented reality application, the detected payment object to retrieve payment object information and user information associated with the detected payment object;
    transmitting the payment object information and user information to a payment system;

receiving, from the payment system, virtual number information, wherein the virtual number information comprises at least one of a virtual account number, a virtual expiration date, and a virtual card verification code;

displaying, as an overlay by the augmented reality application, the virtual number information over the detected payment object in the real-time view; and receiving, via the augmented reality application, a command to pin the virtual number information such that the virtual number information is available when the payment object is not displayed in the real-time view.

2. The computer-implemented method of claim 1, wherein the payment object information comprises at least one of an account number, an expiration date, and a card verification code, and wherein the virtual number information is overlaid over the payment object information of the detected payment object in the real-time view.

3. The computer-implemented method of claim 1, further comprising:
   storing the virtual number information in a cache of the mobile device;
   detecting a trigger condition;
   removing the virtual number information from the cache when the trigger condition is detected; and
   removing, in response to removing the virtual number information from the cache, the overlay from the real-time view.

4. The computer-implemented method of claim 3, wherein the trigger condition includes receiving an indication from the payment system that the virtual number information was utilized in a payment transaction.

5. The computer-implemented method of claim 3, wherein overlaying the virtual number information further comprises displaying the virtual number information in the real-time view until the trigger condition is detected.

6. The computer-implemented method of claim 1, wherein the mobile device comprises augmented reality glasses and the virtual number information being available comprises displaying the pinned virtual number information at a location in the real-time view when the payment object is not displayed in the real-time view.

7. The computer-implemented method of claim 6, wherein the command is a voice command or an eye-based command received by the augmented reality glasses.

8. The computer-implemented method of claim 1, further comprising:
   receiving, via the augmented reality application, a selection of another application installed on the mobile device; and
   transferring the pinned virtual number information to the selected application.

9. The computer-implemented method of claim 1, further comprising:
   receiving, via the augmented reality application, a command to generate new virtual number information;
   generating, based on the command, the new virtual number information; and
   replacing, as another overlay, the virtual number information with the new virtual number information in the real-time view.

10. A non-transitory computer-readable medium storing instructions that, when executed by a processor, cause the processor to perform operations comprising:
    displaying, by an augmented reality application of a mobile device, a real-time view;
    detecting, by the augmented reality application, a payment object within the real-time view;
    scanning, by the augmented reality application, the detected payment object to retrieve payment object information;
    determining, based on the payment object information, that the detected payment object is associated with a payment system;
    transmitting the payment object information to the payment system;
    receiving, from the payment system, virtual number information, wherein the virtual number information comprises at least one of a virtual account number, a virtual expiration date, and a virtual card verification code;
    displaying, as an overlay by the augmented reality application, the virtual number information over the detected payment object in the real-time view; and
    receiving, via the augmented reality application, a command to pin the virtual number information such that the virtual number information is available when the payment object is not displayed in the real-time view.

11. The non-transitory computer-readable medium of claim 10, the operations further comprising:
    storing the virtual number information in a cache of the mobile device;
    detecting a trigger condition;
    removing the virtual number information from the cache when the trigger condition is detected; and
    removing, in response to removing the virtual number information from the cache, the overlay from the real-time view.

12. The non-transitory computer-readable medium of claim 11, wherein the trigger condition includes receiving a signal from the payment system indicating the virtual number information was utilized in a payment transaction.

13. The non-transitory computer-readable medium of claim 11, wherein overlaying the virtual number information further comprises displaying the virtual number information in the real-time view until the trigger condition is detected.

14. The non-transitory computer-readable medium of claim 10, wherein the mobile device comprises augmented reality glasses and the virtual number information being available comprises displaying the pinned virtual number information at a location in the real-time view when the payment object is not displayed in the real-time view.

15. The non-transitory computer-readable medium of claim 14, wherein the command is an audio command or a gesture command received by the augmented reality glasses.

16. The non-transitory computer-readable medium of claim 10, the operations further comprising:
    receiving, via the augmented reality application, a selection of another application installed on the mobile device; and
    transferring the pinned virtual number information to the selected application.

17. The non-transitory computer-readable medium of claim 10, the operations further comprising:
    receiving, from the payment system and responsive to transmitting the payment object information to the payment system, verification that the payment object is authorized to a user of the augmented reality application.

18. An augmented reality device for generating a virtual number, comprising:
    a memory; and
    a processor communicatively coupled to the memory and configured to:
        display, by an augmented reality application of the augmented reality device, a real-time view;

detect, by the augmented reality application, a payment object within the real-time view;

scan, by the augmented reality application, the detected payment object to retrieve payment object information and user information associated with the detected payment object, wherein the payment object information comprises at least one of an account number, an expiration date, and card verification code;

confirm, based on the payment object information, that the detected payment object is associated with a payment system;

transmit the payment object information and the user information to the payment system;

receive, from the payment system, virtual number information, wherein the virtual number information comprises at least one of a virtual account number, a virtual expiration date, and a virtual card verification code;

display, as an overlay by the augmented reality application, the virtual number information over the detected payment object in the real-time view; and receive, via the augmented reality application, a command to pin the virtual number information such that the virtual number information is available when the payment object is not displayed in the real-time view.

* * * * *